United States Patent
Ueda et al.

(10) Patent No.: US 8,408,774 B2
(45) Date of Patent: Apr. 2, 2013

(54) LIGHT REFLECTOR, PLANAR LIGHT SOURCE AND ILLUMINATION DEVICE USING THE SAME

(75) Inventors: Takahiko Ueda, Ibaraki (JP); Hiroshi Koyama, Ibaraki (JP); Haruto Nagakusa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 992 days.

(21) Appl. No.: 12/092,154

(22) PCT Filed: Oct. 30, 2006

(86) PCT No.: PCT/JP2006/321662
§ 371 (c)(1),
(2), (4) Date: Jul. 9, 2008

(87) PCT Pub. No.: WO2007/052609
PCT Pub. Date: May 10, 2007

(65) Prior Publication Data
US 2009/0262539 A1    Oct. 22, 2009

(30) Foreign Application Priority Data
Oct. 31, 2005    (JP) .................... 2005-315607

(51) Int. Cl.
*F21V 7/04*    (2006.01)
(52) U.S. Cl. ....... 362/606; 362/97.4; 362/618; 362/624; 362/625
(58) Field of Classification Search ............ 362/296.02, 362/341, 97.4, 618, 624, 625, 606
See application file for complete search history.

(56) References Cited

U.S. PATENT DOCUMENTS

| 6,194,489 B1 | 2/2001 | Nikkeshi et al. |
| 6,914,719 B2 * | 7/2005 | Koyama et al. ............... 359/361 |
| 2005/0030630 A1 | 2/2005 | Ohnishi et al. |

FOREIGN PATENT DOCUMENTS

| CN | 1268528 A | 10/2000 |
| CN | 1549949 A | 11/2004 |
| EP | 1 645 892 A1 | 4/2006 |
| JP | 4 239540 | 8/1992 |
| JP | 6 298957 | 10/1994 |
| JP | 8 262208 | 10/1996 |
| JP | 2002 31704 | 1/2002 |
| JP | 2003 176367 | 6/2003 |
| JP | 2005 99314 | 4/2005 |
| JP | 2005 202349 | 7/2005 |
| WO | WO 2004/113969 A1 | 12/2004 |

OTHER PUBLICATIONS

Extended European Search Report issued Mar. 14, 2012, in Patent Application No. 06812171.4. Office Action issued Jan. 30, 2013, in European Patent Application No. 06 812 171.4-1524.

\* cited by examiner

*Primary Examiner* — Jason Moon Han
*Assistant Examiner* — Jessica M Apenteng
(74) *Attorney, Agent, or Firm* — Oblon, Spivak, McClelland, Maier & Neustadt, L.L.P.

(57) ABSTRACT

A light reflector comprising a resin film having a reflection angle peak ratio [i.e. (reflection peak value when a light ray is applied at an angle of 45° to the perpendicular line of the reflection surface)/(reflection peak value when a light ray is applied at an angle of 15° to the perpendicular line of the reflection surface)] of from 1.3 to 10, and a specular reflectance [i.e. (reflectance)–(diffuse reflectance)] of from 1.4% to 10%. This light reflector can prevent generation of a bright line even when it is used in an illumination device having a plurality of light sources.

11 Claims, 1 Drawing Sheet

LIGHT REFLECTOR, PLANAR LIGHT SOURCE AND ILLUMINATION DEVICE USING THE SAME

TECHNICAL FIELD

The present invention relates to a light reflector and to a planar light source and an illumination device comprising it. The light reflector of the invention is useful as reflectors for use in planar light source devices, and as light-reflecting members for use in reflectors and various illumination devices.

BACKGROUND ART

Backlight-type liquid-crystal displays, liquid-crystal TVs, illumination signboards and others with a built-in light source therein have been much popularized. Of such backlight-type built-in light sources (planar light sources), a typical structure of an underlight-type backlight comprises, as in FIG. 2, a housing 11 that serves both as a profile case and as a light reflector, a diffuser 14, and a light source such as a cold-cathode lamp 15. A typical structure of a sidelight-type backlight comprises, as in FIG. 3, a light waveguide with a dot print 12 on a transparent acrylic plate 13, a light reflector 11, a diffuser 14, and a light source such as a cold-cathode lamp 15. In these, the light from the light source is reflected on the light reflector, and forms uniform planar light though the diffuser. With the recent tendency toward large-size displays, some improvements have been made also in light sources for illumination devices by increasing their output power and by increasing the number of the light source lamps therein. For increasing the brightness of these devices, plural light sources may be disposed, as in FIG. 2 and FIG. 3.

Heretofore for the light reflectors for such applications, the housing for the profile case is often painted white or a white polyester film (e.g., Patent Reference 1) is much used. However, the white painting could not satisfactorily increase the brightness by reflected light, and a light reflector that comprises a white polyester film is often problematic in point of its discoloration (yellowing) owing to the recent increase in the quantity of light, and materials that are less discolored have become desired. Accordingly, a light reflector that comprises a white polyolefin film is proposed (e.g., Patent References 2 to 5).

Patent Reference 1: JP-A 4-239540
Patent Reference 2: JP-A 6-298957
Patent Reference 3: JP-A 2002-31704
Patent Reference 4: JP-A 8-262208
Patent Reference 5: JP-A 2003-176367

DISCLOSURE OF THE INVENTION

Problems that the Invention is to Solve

However, in case where an underlight-type light source device in which plural light sources are disposed for increasing the brightness is employed, the conventional white polyester film or white polyolefin film is often problematic as causing brightness unevenness owing to a bright line. The problem is that, when plural light source lamps are disposed, the reflected light may concentrate in some sites like interference light owing to the housing structure and the light reflection characteristics of the light reflector (white film), thereby making the brightness uneven. In the invention, the brightness unevenness in a planar light source owing to the localization of the reflected light is referred to as a bright line, and an object of the invention is to prevent the generation of such a bright line.

Apart from it, in a sidelight-type planar light source, the area partially having a high brightness increased owing to the light leakage from the light source around a light source lamp may be referred to as a bright line; but the theme of the present invention should be differentiated from this phenomenon.

Specifically, an object of the invention is to provide a light reflector which hardly generates a bright line even when used in an illumination device heretofore often generating brightness unevenness caused by a bright line, especially for example, an illumination device having a plurality of light sources (light source lamps). Another object of the invention is to provide an illumination device with little brightness unevenness.

Means for Solving the Problems

The present inventors have assiduously studied and, as a result, have found that, when a resin film that is so controlled as to have a reflection angle peak ratio P and a specular reflectance R2 each falling within a specific range is used in a light reflector, then the prior art problems may be solved, and have provided the invention.

Specifically, the invention provides a light reflector comprising a resin film, in which the resin film has a bright line preventing layer (B), the bright line preventing layer (B) contains a filler in a concentration of at most 20% by weight, the reflection angle peak ratio P obtained from the reflection peak value P1 and the reflection peak value P2, as measured on the surface of the bright line preventing layer (B), according to the following formula (1), is from 1.3 to 10, the specular reflectance R2 obtained from the reflectance R1 and the diffuse reflectance R3, as measured on the surface of the bright line preventing layer (B), according to the following formula (2), is from 1.4% to 10%.
[Numerical Formula 1]

$$\text{Reflection Angle Peak Ratio } P=P2/P1 \qquad (1)$$

(in the above formula, P1 means a reflection peak value of the light reflector when a light ray is applied at an angle of 15° to the perpendicular line of the surface of the bright line preventing layer (B) of the light reflector; P2 means a reflection peak value of the light reflector when a light ray is applied at an angle of 45° to the perpendicular line of the surface of the bright line preventing layer (B) of the light reflector),
[Numeral Formula 2]

$$\text{Specular Reflectance } R2=R1-R3 \qquad (2)$$

(in the above formula, R1 means a overall reflectance on the surface of the bright line preventing layer (B) of the light reflector; R3 means a diffuse reflectance on the surface of the bright line preventing layer (B) of the light reflector).

Preferably in the light reflector of the invention, the density by number of the projections and recesses of the surface of the bright line preventing layer (B) is from $0.1 \times 10^{-4}$ to $3.5 \times 10^{-4}/\mu m^2$; and preferably, the reflectance R1 is from 95% to 106%. Preferably, the filler in the bright line preventing layer (B) is an inorganic filler having a mean particle size of from 0.05 to 15 μm and/or an organic filler having a mean dispersed particle size of from 0.05 to 15 μm.

Preferably, the resin film that constitutes the light reflector of the invention is a laminate resin film comprising a substrate layer (A) and the bright line preventing layer (B) provided on at least one side of the substrate layer (A) Preferably, the substrate layer (A) contains a thermoplastic resin (especially a polyolefin-based resin) and a filler, the substrate (A) is stretched, and the areal draw ratio thereof is from 1.3 to 80 times.

Above all, it is desirable that the substrate layer (A) contains a filler in a concentration of from 5% to 75% by weight, and the filler is an inorganic filler (especially a surface-treated inorganic filler) having a mean particle size of from 0.05 to 1.5 μm and/or an organic filler having a mean dispersed particle size of from 0.05 to 1.5 μm. More preferably, the porosity of the substrate layer (A) is from 15% to 70%.

Further, it is desirable that the resin film has a reinforcing layer (C) at least on the side of the substrate layer (A) opposite to the side thereof having the bright line preventing layer (B) thereon; and preferably, the thickness of the bright line preventing layer (B) is from 0.5 to 20 μm.

The invention also provides a planar light source and an illumination device comprising the above-mentioned light reflector.

EFFECT OF THE INVENTION

When set in various planar light source devices that differ in the number of the light sources, the housing form, and the position at which each member is disposed, the light reflector of the invention may effectively prevent the generation of a bright line irrespective of the structure and the constitution of the planar light source in which it is set.

The light reflector of the invention is favorable to a member for light reflection in illumination devices, as it has a high reflectance but hardly causes halation.

BEST MODE FOR CARRYING OUT THE INVENTION

The constitution and the advantage of the light reflector of the invention are described in detail hereinunder. The description of the constitutive elements of the invention given hereinunder is for some typical embodiments of the invention, to which, however, the invention should not be limited. In the invention, the numerical range expressed by the wording "a number to another number" means the range that falls between the former number indicating the lowermost limit of the range and the latter number indicating the uppermost limit thereof.

The light reflector of the invention has a resin film. The resin film comprises a bright line preventing layer (B), and preferably this is a laminate resin film that comprises a substrate layer (A) and the bright line preventing layer (B) provided on at least one side (the reflection face side) of the substrate layer (A), and further preferably, this may optionally have a reinforcing layer (C).

Substrate Layer (A)

The substrate layer (A) is combined with a bright line preventing layer (B) to be a laminate resin film, and this is for increasing the reflectance of the light reflector as a whole, and in addition, this serves as a substrate for more facilitating the formation of the resin film. This is a layer containing a thermoplastic resin, preferably a layer containing a thermoplastic resin and a filler.

(Thermoplastic Resin)

The type of the thermoplastic resin for use for the substrate layer (A) is not specifically defined. The thermoplastic resin (A) for use for the substrate layer (A) includes polyolefin-based resins such as ethylene-based resins (e.g. high-density polyethylene, medium-density polyethylene, low-density polyethylene), propylene-based resins, polymethyl-1-pentene, ethylene-cyclic olefin copolymer; polyamide resins such as nylon-6, nylon-6,6, nylon-6,10, nylon-6,12; thermoplastic polyester resins such as polyethylene terephthalate and its copolymer, polyethylene naphthalate, aliphatic polyester; and other thermoplastic resins such as polycarbonate, atactic polystyrene, syndiotactic polystyrene, polyphenylene sulfide. Only one thermoplastic resin may be selected and used alone, or two or more may be selected and used as combined.

Of those, preferred are polyolefin-based resins in view of the chemical resistance and the production cost thereof; and more preferred are propylene-based resins.

The propylene-based resins include propylene homopolymers, and propylene-based copolymers with α-olefin such as ethylene, 1-butene, 1-hexene, 1-heptene, 4-methyl-1-pentene. The stereospecificity of the resins is not specifically defined. The resins may be isotactic or syndiotactic, and may have any desired degree of stereospecificity. The copolymers may be binary, ternary or quaternary ones, and may be random copolymers or block copolymers.

In case where the main resin that constitutes the substrate layer (A) is a propylene-based resin, a different resin having a lower melting point than the propylene-based resin, such as polyethylene or ethylene-vinyl acetate, may be added thereto in an amount of from 3% to 25% by weight of the propylene-based resin, for improving the stretchability thereof.

Preferably, the content of the thermoplastic resin in the substrate layer (A) is from 25% to 95% by weight, more preferably from 30% to 90% by weight. When the content of the thermoplastic resin in the substrate layer (A) is at least 25% by weight, then the surface is hardly scratched while the film is stretched as in the manner to be mentioned below; and when it is at most 95% by weight, then the film may have sufficient pores.

(Filler)

The filler that may be in the substrate layer (A) along with a thermoplastic resin therein includes various inorganic fillers and organic fillers.

The inorganic filler includes heavy calcium carbonate, precipitated calcium carbonate, calcined clay, talc, titanium oxide, barium sulfate, aluminium sulfate, silica, zinc oxide, magnesium oxide, diatomaceous earth. In addition, those inorganic fillers processed with various surface-treating agents are also usable herein. Above all, heavy calcium carbonate, precipitated calcium carbonate and their surface-treated products, and clay and diatomaceous earth are preferred as they are inexpensive and facilitate the formation of pores in stretching. More preferred are heavy calcium carbonate and precipitated calcium carbonate that have been processed with various surface-treating agents.

As the surface-treating agents, for example, preferred are resin acids, fatty acids, organic acids, sulfuric ester-type anionic surfactants, sulfonic acid-type anionic surfactants, petroleum resin acids, their sodium, potassium or ammonium salts, and their fatty acid esters, resin acid esters, wax and paraffin. Also preferred are nonionic surfactants, dienic polymers, titanate-type coupling agents, silane-type coupling agents, and phosphate-type coupling agents. The sulfuric ester-type anionic surfactants are, for example, long-chain alcohol sulfuric esters, polyoxyethylene alkyl ether sulfuric esters, sulfurized oils, and their sodium or potassium salts. The sulfonic acid-type anionic surfactants are, for example, alkylbenzenesulfonic acids, alkylnaphthalene sulfonic acids, paraffin sulfonic acids, α-olefinsulfonic acids, alkylsulfosuccinic acids, and their sodium or potassium salts. The fatty acids are, for example, caproic acid, caprylic acid, pelargonic acid, capric acid, undecanoic acid, lauric acid, myristic acid, palmitic acid, stearic acid, behenic acid, oleic acid, linolic acid, linolenic acid, eleostearic acid; the organic acids are, for example, maleic acid, sorbic acid; the dienic polymers are, for example, polybutadiene, isoprene; the nonionic surfactants are polyethylene glycol ester-type surfactants. One of these surface-treating agents may be selected and used alone, or two or more may be selected and used as combined. Methods for processing inorganic fillers with these surface-treating agents are described, for example, in JP-A 5-43815, 5-139728, 7-300568, 10-176079, 11-256144, 11-349846, 2001-158863, 2002-220547, 2002-363443, and these are usable herein.

The organic filler for use herein may have a melting point or a glass transition point (e.g., 120 to 300° C.) higher than the melting point or the glass transition point of the thermoplastic resin for use for the substrate layer (A). For example, its examples are polyethylene terephthalate, polybutylene terephthalate, polyamide, polycarbonate, polyethylene naphthalate, polystyrene, melamine resin, cyclic olefin homopolymer, copolymer of cyclic olefin and ethylene, polyethylene sulfite, polyimide, polyethyl ether ketone, polyphenylene sulfite. Above all, preferred are organic fillers having a melting point or a glass transition point higher than that of the thermoplastic resin (especially polyolefin-based resin) for use for the substrate layer (A) and immiscible with the resin from the viewpoint of the pore formation.

One of the inorganic filler or the organic filler may be selected and used singly in the substrate layer (A); or two or more may be selected and used as combined. In case where two or more are combined and used, then the inorganic filler and the organic filler may be mixed and used.

The mean particle size of the inorganic filler and the mean dispersed particle size of the organic filler may be determined, for example, according to a microtrack method, or through primary particle size observation with a scanning electronic microscope (in the invention, the mean value of the data of 100 particles is the mean particle size), or through specific surface area-based computation (in the invention, the specific surface area is measured with a powder specific area meter, Shimadzu's SS-100).

For suitably controlling the size of the pores to be formed in stretching within a preferred range, the mean particle size of the inorganic filler and the mean dispersed particle size of the organic filler used in the substrate layer (A), each are preferably from 0.05 to 1.5 µm, more preferably from 0.1 to 1 µm. When the filler having a mean particle size or a mean diffused particle size of at most 1.5 µm is used, then the pores may be more uniform. When the filler having a mean particle size or a mean dispersed particle size of at least 0.05 µm is used, then predetermined pores may be easier to form in the film.

For forming predetermined pores inside it, the substrate layer (A) is preferably stretched. Preferably, the areal draw ratio of the substrate layer (A) is from 1.3 to 80 times, more preferably from 7 to 70 times, even more preferably from 22 times to 65 times, most preferably from 25 to 60 times.

For forming the pores by stretching within a suitable range, the filler content of the stretched film is preferably from 5% to 75% by weight, more preferably from 10% to 70% by weight. The filler content of at least 5% by weight may readily provide a satisfactory degree of porosity of the film, and the filler content of at most 75% by weight may more effectively prevent surface scratches in the film.

(Structure)

The substrate layer (A) for use in the invention may have a single-layered structure or a multi-layered structure. The thickness of the substrate layer (A) is preferably from 30 to 1000 µm, more preferably from 40 to 400 µm, even more preferably from 50 to 300 µm.

Preferably, pores are formed inside the substrate layer (A) to constitute the light reflector of the invention by the inorganic filler and/or the organic filler in the layer and by stretching. The porosity of the substrate layer (A) is preferably from 15% to 70%, more preferably from 20% to 55%. The "porosity" as referred to in this description is meant to indicate the value calculated according to the following formula (3).

[Numerical Formula]

$$\text{Porosity } P = (\sigma 0 - \sigma)/\sigma 0 \qquad (3)$$

(in the above formula, $\sigma 0$ indicates the true density of the substrate layer (A), and $\sigma$ indicates the density of the substrate layer (A)).

So far as the unstretched material does not contain much air, the true density is nearly equal to the density of the unstretched film. The density of the substrate layer (A) for use in the invention generally falls between 0.5 and 1.2 g/cm³. Films having more pores have a smaller density and have a larger porosity. Films having a larger porosity may have improved surface-reflecting characteristics.

Bright Line Preventing Layer (B)

In the invention, the bright line preventing layer (B) is provided so that the resin film, when used as a light reflector, may express a reflection angle peak ratio P and a specular reflectance R2 each falling within a specific numerical range.

The bright line preventing layer (B) may be formed singly, or on one side of the light-reflective face of the substrate layer (A), or on both sides of the substrate layer (A). For forming the bright line preventing layer (B), employable is a method of extrusion using an I die or an O die like ordinary single-layered film formation method; a method of coextrusion of starting melts for the bright line preventing layer (B) and the substrate layer (A), using a multilayer T die or I die, thereby forming a resin film; a method of extruding a starting melt for the bright line preventing layer (B) onto a formed substrate layer (A) for lamination; or a method of forming a substrate layer (A) and then sticking a bright line preventing layer (B) to it via an adhesive layer.

After shaped by extrusion, the resin film is preferably stretched. The single-layered resin film or the laminate resin film formed by coextrusion may be monoaxially stretched or biaxially stretched after its formation. After a substrate layer (A) is formed, then it is monoaxially stretched, and then a starting melt for the bright line preventing layer (B) is extruded for lamination on it, and the laminate film is stretched to give a stretched laminate resin film.

For the bright line preventing layer (B), the same thermoplastic resin as that used for the substrate layer (A) may be used. The particle size of the filler for use in the bright line preventing layer (B) is preferably from 0.05 to 15 µm, more preferably from 2 to 10 µm. When a filler having a particle size of at least 0.05 µm is used, then preferred surface projections and recesses may be formed and the film may hardly form a bright line. When a filler having a particle size of at most 15 µm is used, then a light reflector having a high surface strength may be readily produced, in which the filler may hardly drop off. The amount of the filler is preferably from 0% to 20% by weight, more preferably from 1% to 15% by weight. When the amount is more than 20% by weight, then the number of the surface projections and recesses may be too large, overstepping the preferred range, and the film could hardly prevent the generation of a bright line.

The thickness of the bright line preventing layer (B) is preferably from 0.5 to 20 µm, more preferably from 2 to 6 µm. When the thickness is at least 0.5 µm, then the film may exhibit a sufficient bright line preventing effect. When it is at most 20 μm, then the layer may hardly detract from the reflective capability of the substrate layer (A) and the film may well keep a high reflectance.

Reinforcing Layer (C)

The resin film to constitute the light reflector of the invention may have a reinforcing layer (C) in addition to the substrate layer (A) and the bright line preventing layer (B). The reinforcing layer (C) is a layer not falling in the category of the substrate layer (A) and the bright line preventing layer (B), and this is a layer capable of reinforcing the strength of the resin film as a whole. The reinforcing layer (C) may be provided on the reflective face side of the substrate layer (A). Accordingly, the layer (C) may be provided between the substrate layer (A) and the bright line preventing layer (B) to have a constitution of (B)/(C)/(A). The layer (C) may be provided on the side of the substrate layer (A) opposite to the reflective face side thereof to have a constitution of (B)/(A)/(C).

For forming the reinforcing layer (C), employable is a method of coextrusion of a starting melt for the reinforcing layer (C), using a multilayer T-die or I-die, before stretching the substrate layer (A), followed by stretching the obtained laminate; when the substrate layer (A) is biaxially stretched, a method of extruding a starting melt for the reinforcing layer (C) and sticking it to it after monoaxial stretching of the layer (A), followed by monoaxially stretching the resulting laminate; or a method of forming the substrate layer (A) by stretching, then extruding a starting resin for the reinforcing layer (C) and sticking it thereto directly or via an adhesive layer.

For the reinforcing layer (C), the same thermoplastic resin as that for the substrate layer (A) may be used. This may contain the above-mentioned filler, and the filler content is preferably from 0% to 20% by weight, more preferably from 0% to 10% by weight, even more preferably from 0% to 5% by weight, still more preferably from 0% to 3% by weight.

The thickness of the reinforcing layer (C) is preferably at least 1 μm, more preferably from 2 to 30 μm, even more preferably from 3 to 20 μm. When the thickness is at least 1 μm, then the layer may improve the surface strength and the workability of the light reflector.

Resin Film
(Layer Constitution)

The resin film that constitutes the light reflector of the invention is preferably a laminate film comprising the above substrate layer (A) and the bright line preventing layer (B). For example, the film may have a laminate structure comprising a bright line preventing layer (B) laminated on both sides of the substrate layer (A). The resin film to constitute the light reflector of the invention may also have a laminate structure comprising any other layer than the substrate layer (A) and the bright line preventing layer (B). For example, the film may have a reinforcing layer (C) on the substrate layer (A) on the side thereof opposite to the side having the bright line preventing layer (B), or between the substrate layer (A) and the bright line preventing layer (B). Specific layer constitution examples of the resin film are (B)/(A), (B)/(A)/(B), (B)/(A)/(C), (B)/(C)/(A), (B)/(C)/(A)/(B), (B)/(C)/(A)/(C), (B)/(C)/(A)/(C)/(B).

(Additive)

If desired, the resin film that constitutes the light reflector of the invention may contain fluorescent brightener, stabilizer, light stabilizer, dispersant, lubricant. The stabilizer may be a steric-hindered phenol-type, or phosphorus-containing, or amine-type stabilizer, and its amount is preferably from 0.001% to 1% by weight of the layer containing the stabilizer.

The light stabilizer may be a steric-hindered amine-type, or benzotriazole-type, or benzophenone-type light stabilizer, and its amount is preferably from 0.001% to 1% by weight of the layer containing it. The inorganic filler dispersant may be a silane-coupling agent, a higher fatty acid such as oleic acid or stearic acid, a metal soap, a polyacrylic acid, a polymethacrylic acid or their salt, and its amount is preferably from 0.01% to 4% by weight of the layer containing it.

Preferably, the resin film is a laminate of plural layers, in which the above-mentioned additives may be added to each layer as suitably selected.

(Shaping)

For forming the resin film, employable is any ordinary monoaxially-stretching or biaxially-stretching method. Concretely, herein employable is a monoaxial-stretching method that comprises sheetwise extruding resin melt(s) through a single-layer or multi-layer T-die or I-die connected to a screw extruder, and then monoaxially stretching the resulting sheet in a mode of machine-direction stretching to be attained by utilizing the peripheral speed difference between multiple rolls; or a biaxial-stretching method that comprises a combination of the same step as in the monoaxial-stretching method and an additional step of cross-direction stretching to be attained in a tenter oven; or a simultaneous biaxial-stretching method to be attained by a combination of a tenter oven and a linear motor.

The stretching temperature is preferably lower by 2 to 60° C. than the melting point of the thermoplastic resin used, but is higher by 2 to 60° C. than the glass transition point of the resin. When the thermoplastic resin to be used is propylene homopolymer (melting point, 155 to 167° C.), then the stretching temperature preferably falls between 95 and 165° C. When the resin is polyethylene terephthalate (glass transition point: about 70° C.), then the stretching temperature preferably falls between 100 and 130° C. The pulling rate for the stretching preferably falls between 20 and 350 m/min.

The stretched film may be optionally heat-treated (annealed) for promoting the crystallization thereof and for reducing the thermal shrinkage of the film.

For suitably controlling the size of the pores to be formed in the stretched film, the areal draw ratio of the substrate layer (A) preferably falls between 1.3 and 80 times, more preferably between 7 and 70 times, even more preferably between 22 and 65 times, most preferably between 25 and 60 times. The areal draw ratio falling between 1.3 and 80 times may readily form fine pores in the film, not lowering the reflectivity of the film.

Light Reflector

The light reflector of the invention is characterized in that it comprises the above-mentioned resin film. The light reflector of the invention may be formed of the above-mentioned resin film alone, or may comprise the resin film and any other suitable material added thereto.

The resin film for use in the light reflector of the invention has a reflection angle peak ratio P and a specular reflectance R2 each falling within a specific numerical range. Having the reflection angle peak ratio P and the specular reflectance R2 each falling within a specific numerical range, the resin film may effectively prevent the generation of a bright line.

Light is applied to the light reflector at an angle of 15 degrees to the perpendicular line of the surface of the bright line preventing layer (B), and the reflectance of the light reflector is measured with changing the angle of the light receiver; and the maximum value of the reflectance thus measured is referred to as a reflection peak value P1. Similarly, light is applied to the light reflector at an angle of 45 degrees to the surface of the bright line preventing layer (B), and the reflectance of the light reflector is measured with changing the angle of the light receiver; and the maximum value of the reflectance thus measured is referred to as a reflection peak value P2. Thus obtained, the value P2 is divided by the value P1, and the resulting value is the reflection angle peak ratio P.

The resin film for use in the light reflector of the invention has the reflection angle peak ratio P, as represented by the above formula (1), of from 1.3 to 10, preferably from 1.4 to 3. The reflection angle peak ratio P is an index of reflected light distribution. In case where the reflection angle peak ratio P is less than 1.3, then the area between lamps may be dark and a bright line may be often formed. When the reflection angle peak ratio P is more than 10, then the area around lamps may be dark and a bright line may also be often formed.

The overall reflectance measured on the surface of the bright line preventing layer (B) of the light reflector is referred to as R1, and the diffuse reflectance measured on the surface of the bright line preventing layer (B) of the light reflector is referred to as R3. Thus obtained, the value R3 is subtracted from the value R1, and the resulting value is referred to as a specular reflectance R2.

The light reflector of the invention has the specular reflectance R2, as represented by the above formula (2), of from 1.4% to 10%, preferably from 2% to 5%. In case where the specular reflectance R2 is less than 1.4, then the area between lamps may be dark and a bright line may be often formed. When the specular reflectance R2 is more than 10, then the area between lamps may be too light, thereby giving a bright line.

Preferably in the reflective surface of the light reflector of the invention, the density by number of the projections and recesses is from $0.1 \times 10^{-4}$ to $3.5 \times 10^{-4}/\mu m^2$, more preferably from $0.3 \times 10^{-4}$ to $3.0 \times 10^{-4}/\mu m^2$. In case where the density by number of the projections and recesses is less than $0.1 \times 10^{-4}/\mu m^2$ or more than $3.5 \times 10^{-4}/\mu m^2$, then the reflection peak ratio P could not be controlled to fall within the range of the invention.

The reflectance R1 measured at a wavelength 550 nm is preferably from 95% to 106%, more preferably from 98% to 106%. In case where the reflectance is less than 95%, the planar light source could not have a sufficient brightness. The reflectance R1 is preferably larger, but in the embodiments of the invention, the reflectance R1 could hardly be larger than 106%.

The light reflector of the invention is useful as a planar light source, which includes, for example, backlights for liquid-crystal display devices such as liquid-crystal TVs, monitors, and backlights for illumination signboards.

In addition, the light reflector of the invention is useful as illumination devices. The illumination devices of the invention are, for example, illumination devices for household use, such as ceiling lights, down lights, base lights, kitchen lights, brackets, pendants, etc.

EXAMPLES

Examples, Comparative Examples and Test Examples are given below, and the invention is described further concretely. The material used, its amount and the ratio, and the details of the treatment shown below may be suitably modified or changed not overstepping the spirit and the scope of the invention. Accordingly, the scope of the invention should not be limited by the following Examples. The materials used in Examples are shown in Table 1.

TABLE 1

| Ingredient | Details |
| --- | --- |
| PP1 | propylene homopolymer [Nippon Polypro's Novatec PP:EA8] (MFR (230° C., 2.16 kg load) = 0.8 g/10 min), melting point (167° C., DSC peak temperature) |
| PP2 | propylene homopolymer [Nippon Polypro's Novatec PP:MA4] (MFR (230° C., 2.16 kg load) = 5 g/10 min), melting point (167° C., DSC peak temperature) |
| HDPE | high-density polyethylene [Nippon Polyethylene's Novatec HD:HJ360] (MFR (190° C., 2.16 kg load) = 5.5 g/10 min), melting point (134° C., DSC peak temperature) |
| Heavy Calcium Carbonate (a) | surface-treated precipitated calcium carbonate having a mean particle size of 0.15 μm (surface treatment: fatty acid treatment) [Maruo Calcium's MSK-PO] |
| Heavy Calcium Carbonate (b) | surface-treated precipitated calcium carbonate having a mean particle size of 0.3 μm (surface treatment: fatty acid treatment) [Maruo Calcium's Calfine YM30] |
| Heavy Calcium Carbonate (c) | heavy calcium carbonate having a mean particle size of 8 μm [Bihoku Funka Kogyo's BF300] |
| Titanium Dioxide | titanium dioxide having a mean particle size of 0.2 μm [Ishihara Sangyo's CR-60] |

Examples 1 to 3

The materials shown in Table 1 were mixed in a ratio as in Table 2 to prepare a composition (A), which was melt-kneaded in an extruder at 250° C. Next, this was sheetwise extruded out and cooled to about 60° C. with a chill roll to prepare a substrate layer (A). The substrate layer (A) was reheated at 145° C., and then stretched to the draw ratio as in Table 2 in the machine direction thereof by utilizing the peripheral speed difference between a number of rolls.

Compositions (B) and (C) prepared by mixing the materials shown in Table 1 in the ratio shown in Table 2 were separately melt-kneaded, and then melt-extruded onto both faces of the substrate layer (A) to form thereon a bright line preventing layer (B) and a reinforcing layer (C), as laminated in an order of B/C/A/C. Next, the laminate was reheated at 160° C., and stretched to the draw ratio as in Table 2 in the cross direction thereof in a tenter. Next, this was annealed at 160° C. and then cooled to 60° C., and its edges were trimmed away to give a four-layered laminate film having a thickness as in Table 2. The laminate film is used as a light reflector.

Comparative Example 1

A light reflector was produced in the same manner as in Examples 1 to 3, for which, however, the materials shown in Table 1 were mixed in the ratio as in Table 2.

Text Example

The light reflectors obtained in Examples 1 to 3 and Comparative Example 1 were tested as follows:

(1) Measurement with Goniophotometer:

The samples were analyzed with an automatic goniophotometer (Murakami Shikisai Kenkyujols GP200). At a light radiation angle of 45 degrees, at a light receiving angle of from −60 to 90 degrees, the samples were analyzed to determine the reflection peak value P2.

Under the same condition as the measurement conditions of P2 but the light radiation angle was changed to 15 degrees, the samples were analyzed to determine P1, which is a relative reflectance to P2.

P2/P1 is the peak ratio P.

(2) Measurement with Spectrophotometer Having Integrating Sphere:

Using a spectrophotometer having an integrating sphere of φ150 mm (Hitachi's U-3310), the samples were analyzed under the condition d of JIS-Z8722 to determine the reflectance at a wavelength of 550 nm, R1.

Using a spectrophotometer having an integrating sphere of φ150 mm (Hitachi's U-3310), the samples were analyzed under the condition d of JIS-Z8722. In this, a light trap was used to cut off the regular reflection component, and the reflectance at a wavelength of 550 nm thus measured is a diffuse reflectance, R3.

R1−R3 is the specular reflectance R2.

(3) Measurement of Porosity:

According to JIS-P8118, the density σ of the substrate layer (A) was measured, and the true density σ0 of the substrate layer (A) was measured. According to the above-mentioned formula (3), the porosity was computed.

(4) Determination of the Density by Number of Surface Projections and Recesses:

Using a non-contact three-dimensional surface profile analyzer (Zygo's New View 5010), the samples were analyzed. The test area was 2 mm×2 mm; the object lens was 20-power; and wavelengths of at most 14 μm were cut off. The data were analyzed with an analyzing software (Zygo's Metro Pro), and the peak density ($1/\mu m^2$) thus obtained is the density by number of the surface projections and recesses of each sample.

(5) Evaluation of Bright Line Level:

The samples were set in a planar light source device of FIG. 2, and evaluated for the bright line level according to the following 5 ranks. The details of each level are mentioned below. The level 3 or more is acceptable for light reflector.

5: The sample gave no bright line, and is on a good level.
4: The sample gave some bright lines, but is on a good level.
3: The sample gave bright lines, but is not problematic in practical use.
2: The sample gave bright lines, and is problematic in practical use.
1: The sample gave serious bright lines, and is unacceptable in practical use.

The test data are shown in Tables 2 and 3.

TABLE 2

| | Composition of Substrate Layer (A) (wt. %) | | | | Composition of Bright Line Preventing Layer (B) (wt. %) | | | | Composition of Reinforcing Layer (C) (wt. %) | | | |
|---|---|---|---|---|---|---|---|---|---|---|---|---|
| | PP 1 | HDPE | $CaCO_3$ | $TiO_2$ | PP 2 | HDPE | $CaCO_3$ | $TiO_2$ | PP 2 | HDPE | $CaCO_3$ | $TiO_2$ |
| Example 1 | 51 | 4 | 40(b) | 5 | 97 | — | 2(a) | 1 | 100 | — | — | — |
| Example 2 | 51 | 4 | 40(b) | 5 | 90 | — | 9(b) | 1 | 100 | — | — | — |
| Example 3 | 51 | 4 | 40(b) | 5 | 100 | — | — | — | 90 | — | 9(c) | 1 |
| Comparative Example 1 | 51 | 4 | 40(a) | 5 | 40 | — | 59(b) | 1 | 100 | — | — | — |

| | | | Draw Ratio | | |
|---|---|---|---|---|---|
| | Layer Constitution | Thickness of Layer (μm) | MD (machine direction) | CD (cross direction) | Areal Draw Ratio MD × CD |
| Example 1 | B/C/A/C | 3/10/200/13 | 4.5 times | 8.5 times | 38.3 times |
| Example 2 | B/C/A/C | 3/10/200/13 | 4.5 times | 8.5 times | 38.3 times |
| Example 3 | B/C/A/C | 3/10/200/13 | 4.5 times | 8.5 times | 38.3 times |
| Comparative Example 1 | B/C/A/C | 3/10/200/13 | 4.5 times | 8.5 times | 38.3 times |

TABLE 3

| | Goniophotometer | | | Spectrophotometer with integrating sphere (%, 550 nm) | | | | Density by number of | |
|---|---|---|---|---|---|---|---|---|---|
| | 15° Reflection Peak P1 | 45° Reflection Peak P2 | Peak Ratio P (P2/P1) | Reflectance R1 | Diffuse Reflectance R3 | Specular Reflectance R2 (R1 − R3) | Porosity (%) | Surface Projections and Recesses ($10^{-4}/\mu m^2$) | Bright Line Level |
| Example 1 | 73.0 | 100.0 | 1.4 | 99.0 | 95.5 | 3.5 | 46 | 1.6 | 4 |
| Example 2 | 43.0 | 74.0 | 1.7 | 99.3 | 97.8 | 1.5 | 46 | 3.0 | 3 |
| Example 3 | 4.9 | 8.3 | 1.7 | 99.1 | 96.2 | 2.9 | 46 | 0.4 | 5 |
| Comparative Example 1 | 0.8 | 0.8 | 1.0 | 99.5 | 99.4 | 0.1 | 46 | 5.6 | 1 |

INDUSTRIAL APPLICABILITY

The light reflector of the invention can effectively prevent brightness unevenness when used in an illumination device heretofore often generating brightness unevenness caused by a bright line, especially for example, an illumination device having a plurality of light sources (light source lamps). The light reflector may exhibit the effect when set in various types of planar light source devices that differ in the number of the light sources, the housing form, and the position at which each member is disposed. Accordingly, the industrial applicability of the invention is high.

Figure 1:
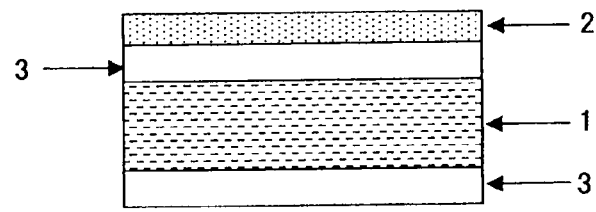
FIG. 1 It is a cross-sectional view showing an example of the layer constitution of a light reflector.
Figure 2:
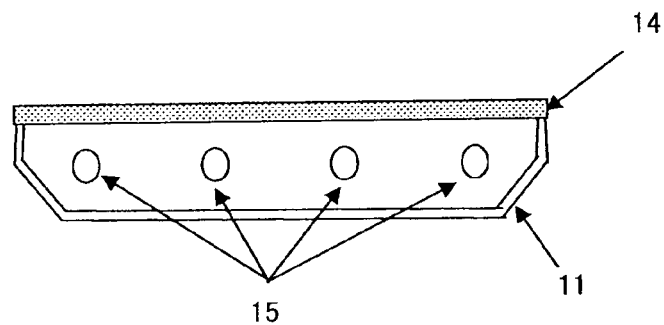
FIG. 2 It is a cross-sectional view showing a constitution of an underlight-type backlight.
Figure 3:
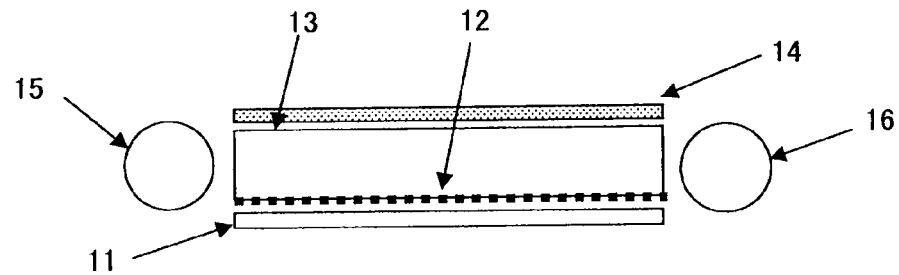
FIG. 3 It is a cross-sectional view showing a constitution of a sidelight-type backlight.

| DESCRIPTION OF NUMERAL REFERENCES | |
|---|---|
| 1 | Substrate Layer (A) |
| 2 | Bright Line Preventing Layer (B) |
| 3 | Reinforcing Layer (C) |
| 11 | Light Reflector (housing) |
| 12 | White Dot Print for Reflection |
| 13 | Acrylic Plate (waveguide) |
| 14 | Diffuser |
| 15 | Cold Cathode Lamp |

The invention claimed is:

1. A light reflector comprising:

a resin film, wherein the resin film comprises a bright line preventing layer (B), the bright line preventing layer (B) contains a filler in a concentration of at most 20% by weight, the light reflector has a reflection angle peak ratio P of from 1.3 to 10, in which the reflection angle peak ratio P is obtained from a reflection peak value P1 and a reflection peak value P2, as measured on a surface of the bright line preventing layer (B), according to the formula (1):

$$\text{Reflection Angle Peak Ratio } P = P2/P1 \qquad (1)$$

wherein P1 represents a reflection peak value of the light reflector when a light ray is applied at an angle of 15° to a perpendicular line of the surface of the bright line preventing layer (B) of the light reflector; P2 represents a reflection peak value of the light reflector when a light ray is applied at an angle of 45° to the perpendicular line of the surface of the bright line preventing layer (B) of the light reflector, the light reflector has a specular reflectance R2 of from 1.4% to 10%, in which the specular reflectance R2 is obtained from a reflectance R1 and a diffuse reflectance R3, as measured on the surface of the bright line preventing layer (B), according to formula (2):

$$\text{Specular Reflectance } R2 = R1 - R3 \qquad (2)$$

wherein R1 represents a reflectance on the surface of the bright line preventing layer (B) of the light reflector; R3 represents a diffuse reflectance on the surface of the bright line preventing layer (B) of the light reflector, the surface of the bright line preventing layer (B) has projections and recesses, and a density by number of the projections and recesses of the surface of the bright line preventing layer (B) is from $0.1 \times 10^{-4}$ to $3.5 \times 10^{-4}/\mu m^2$.

2. The light reflector according to claim 1, wherein the reflectance RI is from 95% to 106%.

3. The light reflector according to claim 1, wherein the filler in the bright line preventing layer (B) comprises at least one of an inorganic filler having a mean particle size of from 0.05 to 15 µm and an organic filler having a mean dispersed particle size of from 0.05 to 15 µm.

4. The light reflector according to claim 1, wherein the resin film is a laminate resin film comprising a substrate layer (A) and the bright line preventing layer (B) provided on at least one side of the substrate layer (A).

5. The light reflector according to claim 4, wherein the substrate layer (A) is a stretched layer, and the substrate layer (A) has an areal draw ratio of from 1.3 to 80 times.

6. The light reflector according to claim 4, wherein the substrate layer (A) contains a thermoplastic resin and a filler in a concentration of from 5% to 75% by weight, and the filler comprises at least one of an inorganic filler having a mean particle size of from 0.05 to 1.5 µm and an organic filler having a mean dispersed particle size of from 0.05 to 1.5 µm.

7. The light reflector according to claim 6, wherein the inorganic filler in the substrate layer (A) is a surface-treated inorganic filler.

8. The light reflector according to claim 4, wherein the substrate layer (A) contains a polyolefin-based resin as a thermoplastic resin.

9. The light reflector according to claim 4, wherein the substrate layer (A) has a porosity of from 15 to 70%.

10. A planar light source comprising a light reflector of claim 1.

11. An illumination device comprising a light reflector of claim 1.

* * * * *